United States Patent [19]
Weber et al.

[11] Patent Number: 5,613,384
[45] Date of Patent: Mar. 25, 1997

[54] STEERING WHEEL LOCKING DEVICE

[76] Inventors: Paul J. Weber; Marianne Weber, both of 2881 E. Oakland Park Blvd., Ft. Lauderdale, Fla. 33306

[21] Appl. No.: 497,179

[22] Filed: Jun. 30, 1995

[51] Int. Cl.$^6$ .................................................. B60R 25/02
[52] U.S. Cl. .................................................. 70/209; 70/226
[58] Field of Search .......................... 70/209, 225, 226, 70/227, 231, 252, 253

[56] References Cited

U.S. PATENT DOCUMENTS

| | | | |
|---|---|---|---|
| 1,154,389 | 9/1915 | Fogalsang | 70/209 |
| 1,329,913 | 2/1920 | McGuire | 70/209 |
| 1,395,532 | 11/1921 | Tilden | 70/209 |
| 1,829,444 | 10/1931 | Goebel et al. | 70/209 |
| 1,982,813 | 12/1934 | Jacobi | 70/371 |
| 2,169,438 | 8/1939 | Sherman | 70/211 |
| 3,245,240 | 4/1966 | De Forrest | 70/209 |
| 3,401,543 | 9/1968 | Lewis | 70/226 |
| 4,075,878 | 2/1978 | Best | 70/49 |
| 4,272,975 | 6/1981 | Patriquin | 70/369 |
| 4,570,465 | 2/1986 | Bennett | 70/18 |
| 5,095,723 | 3/1992 | Lin | 70/209 |
| 5,097,685 | 3/1992 | Lien | 70/209 |
| 5,353,614 | 11/1994 | Anderson | 70/209 |
| 5,415,018 | 5/1995 | Ferrante | 70/209 |
| 5,450,736 | 9/1995 | Volkmar | 70/209 |

FOREIGN PATENT DOCUMENTS 2263455  7/1993  United Kingdom ..................... 70/209

Primary Examiner—Steven N. Meyers
Assistant Examiner—Donald J. Lecher
Attorney, Agent, or Firm—John Lezdey

[57] ABSTRACT

A device for disabling a steering wheel of a vehicle or vessel. The device has a sheathing jacket which covers the steering wheel and locks onto the rim. A blocking bar is provided which interferes with the turning of the wheel.

15 Claims, 3 Drawing Sheets

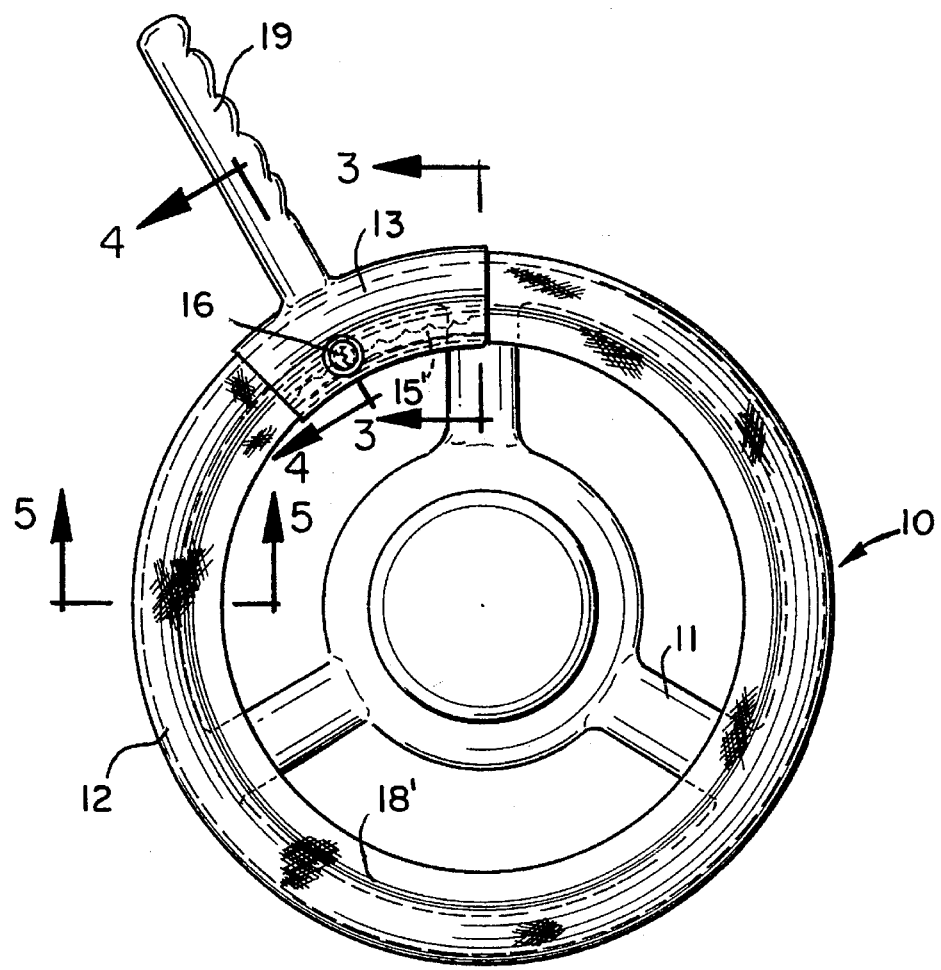
FIG. 2
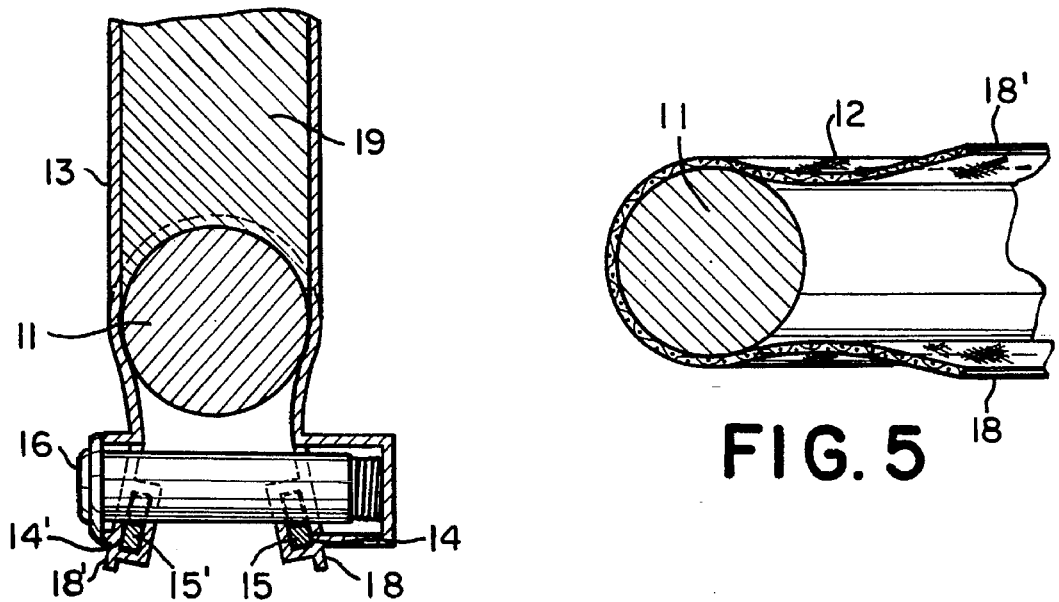
FIG. 4
FIG. 5

STEERING WHEEL LOCKING DEVICE

The instant invention provides an anti-theft device for disabling a steering wheel of a vehicle or vessel. When locked on a steering wheel, the device restricts rotation to less than a full revolution and is difficult to remove, thereby precluding effective steering of the vehicle or vessel.

BACKGROUND OF THE INVENTION

Various types of steering wheel security devices are known in the prior art.

They can be separated into three general categories: (1) those that engage only a portion of the circumferential element of a steering wheel; (2) those that engage the center post of a steering wheel; and (3) those that engage the entire circumferential element of a steering wheel. The instant invention is generally of the latter type.

Devices of the first type generally comprise one or more elongated bar sections which are fixed in a locked relationship with only a portion of the circumferential element or "rim" of the steering wheel. When in locked relationship, the bar or bars extend outwardly from the rim a sufficient distance to enable them to engage the seat or some other element of the vehicle, so as to restrict rotation of the steering wheel to substantially less than a full revolution. Exemplary of these types are:

U.S. Pat. No. 5,129,245 teaches a telescopic steering lock device which, as shown generally in FIG. 4 thereof, locks in tangential relationship to a rim of a steering wheel. When in locked relationship, the device lies generally in the plane defined by the rim.

U.S. Pat. No. 5,095,723 shows an anti-theft device similar to the latter which employs like upper and lower shield members. The locking system of this reference can be used in the present device.

U.S. Pat. Nos. 5,284,037 and 5,199,283 show telescoping devices which engage the two separate portions of a steering wheel with hooks. The patents show locking devices which may be used in the present invention.

U.S. Pat. No. 5,199,284 shows a telescoping device with two separate pawl members, each of which engages a portion of the rim of a steering wheel.

U.S. Pat. No. 5,230,232 shows a contrivance which engages two portions of a steering wheel with notch members.

U.S. Pat. No. 5,163,309 shows an anti-theft device which engages a single portion of a rim of the steering wheel of an automobile, with pinching plates and a U-shaped pressing rod for engaging the gauge panel board of the automobile.

Other variations similar to the above include U.S. Pat. Nos. 5,257,518; 5,097,685; 5,138,853; 5,277,042 and U.S. Pat. No. Des. D331,870 and D339,733.

It is a common misconception that steering wheels are strong and/or are rigidly constructed. In actuality, many, if not most, of them are constructed of an inner circular core made of a metallic material with a relatively thick covering around the core made of leather, plastic or the like. The covering is only sufficiently thick as to merely create the illusion that the steering wheel has a substantial appearance and feel to it. However, the metallic portion of the steering wheel, i.e., the inner core, is typically not constructed of large gauge stock and in not specifically hardened in any manner. Accordingly it is relatively easy for a thief to employ a tool such as a bolt-cutter, hack-saw or tin-snips to merely cut through those portions of the rim to which the device is engaged. Thus, all of the above inventions share a common major disadvantage, namely: steering can be easily enabled merely by hack-sawing through the portion or portions of the rim engaged by the device and thereafter, simply removing the device.

U.S. Pat. No. 5,275,030 and FIG. 3 of U.S. Pat. No. 5,197,308, both show anti-theft devices which engage the steering posts of a steering wheel, in locked relationship. These devices share the disadvantages of being exceedingly complicated and cumbersome to install and/or, of requiring plural separate components.

Finally U.S. Pat. No. 1,395,532 shows a theft prevention attachment which would appear to sheath the rim of a steering wheel, but nonetheless would appear to share the disadvantages of the various of foregoing devices, namely: it embodies a plurality of separate elements; it is complicated to install; and it would appear to be readily disabled by bolt-cutters or a hack-saw.

Thus, there exists a need for a simple device for disabling a steering wheel, which completely sheathes the rim of it; is easy to install; and is constructed of bolt cutter, hack saw and tin-snip resistant materials.

SUMMARY OF THE INVENTION

The anti-theft device of the present invention is adapted to be secured around the circumference of the steering wheel and provide a blocking bar which extends laterally beyond the rim of the steering wheel to interfere with or prevent movement of the wheel. Generally, the device comprises a sheathing jacket which substantially completely covers the circumference thickness of the steering wheel rim and completely covers the overall circumference of the rim. The jacket has a male end and a female end positioned and adapted to receive the male end. A blocking bar is provided that interfits in a lateral plane with the sheathing jacket and extends beyond the overall circumference of the rim to interfere with or prevent turning of the steering wheel. A lock is provided to secure the male and female ends of the sheathing jacket and the blocking bar together on the steering wheel.

Upon locking, the device is thus secured on the steering wheel, the blocking bar interferes with or prevents the rotation of the steering wheel of the vehicle by hitting the person, the door, the console or the windshield, as the person attempts to turn the wheel. Further, the device is made of hard material which is resistant to mechanical abuse such as cutting, hammering or prying and is heat resistant to blow torches.

In one preferred embodiment as shown in FIG. 6 the device includes a retaining member or disk 20 adapted to cover the area over the hub of the steering wheel which interfits with the opening between the flanges of said sheathing jacket and is secured by said locking mechanisms.

In another preferred embodiment the blocking bar 19 can be laterally extended to the required length to prevent rotation of the steering wheel.

A primary object of this invention is to provide a locking device for disabling a steering wheel of a vehicle or vessel wherein the device is substantially completely enclosed and exposes only a limited and hindered area to mechanical deformation or heat degradation.

It is another object of the present invention to provide a steering wheel locking device which may be adapted for use with steering wheels of various ranges in size.

It is still another object of the present invention to provide a steering wheel lock which can be relatively easily stored when not in use.

BRIEF DESCRIPTION OF THE DRAWINGS

It is understood that the invention is not limited in its application to the details of construction and arrangement of the parts illustrated in the accompanying drawings, since the invention is capable of other embodiments and of being practiced or carried out in various ways. Also it is understood that the phraseology or terminology employed herein is for the purpose of description and not of limitation.

FIG. 2 illustrates a top view of the steering wheel locking device of the present invention in an assembled state and in place on a steering wheel;

FIG. 4 is a cross-sectional view taken along line 4–4 of FIG. 2 showing the locking mechanism in a locked state securing blocking bar;

FIG. 5 is a cross-sectional view taken along line 5–5 of FIG. 2; and

DESCRIPTION OF THE PREFERRED EMBODIMENTS

Figure 1:
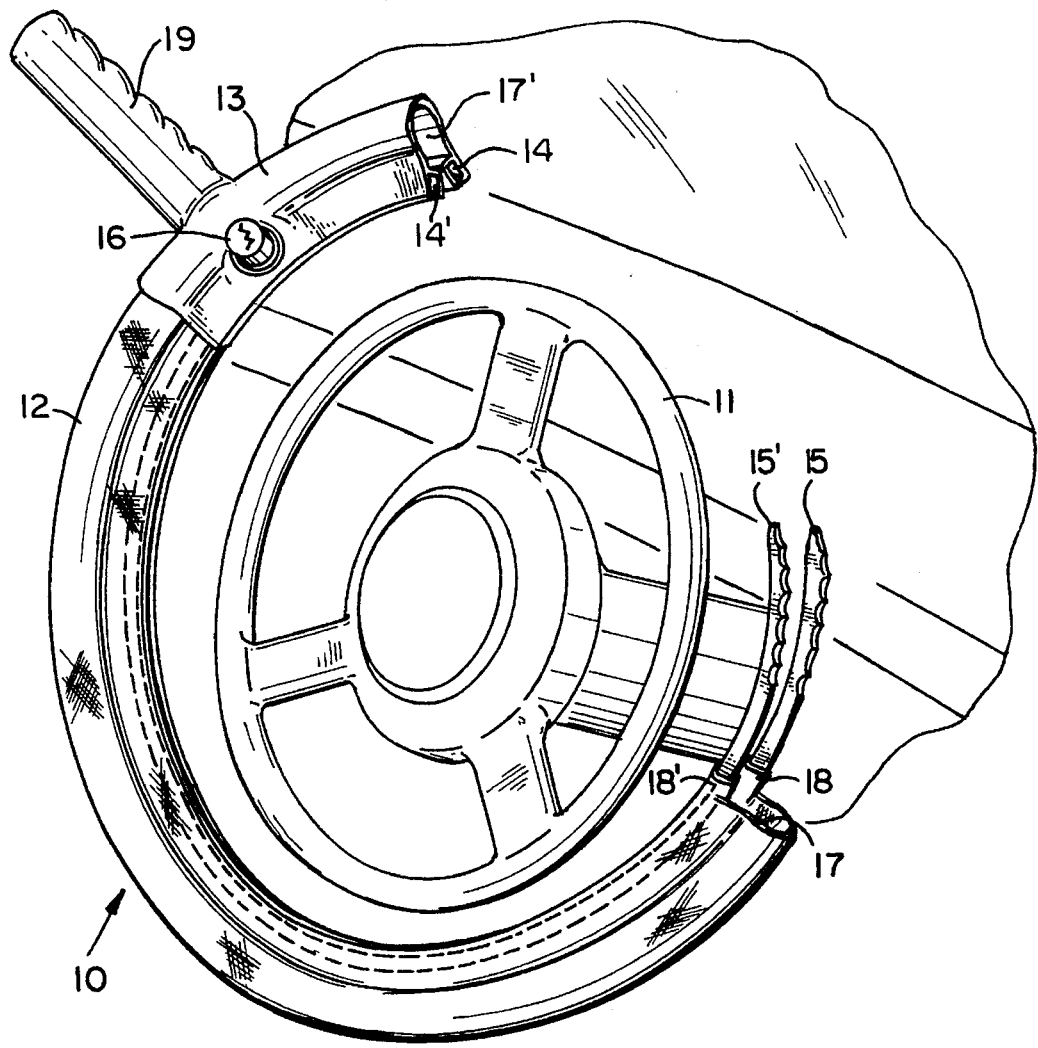
FIG. 1 shows an exploded perspective view of the steering wheel locking device of the present invention in position for installation on a vehicle or a vessel.
Figure 3:
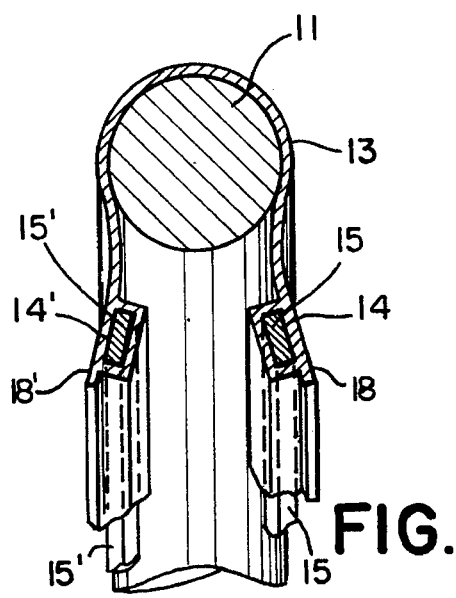
FIG. 3 is a cross-sectional view of the female end taken along line 3–3 of FIG. 2 in the locked state showing the reinforcing inserts 15–15' positioned in channels 14–14'.

Referring to FIGS. 1 and 2 there is shown a steering wheel device 10 according to the present invention which comprises a sheathing jacket 12 in combination with a blocking bar 19 and a locking mechanism 13.

The sheathing jacket 12 substantially covers the tubular circumference of the steering wheel rim 11 and completely covers the overall circumference of the rim when the male end and the female end of the jacket 12 are connected. Generally, the sheathing jacket 12 covers about one-half to about three-fourths of the thickness circumference depending on the flexibility of the material of construction. The inwardly projecting flanges 18 and 18' of the sheathing jacket extend over a large portion of the area between the steering wheel 11 and the steering wheel hub. The sheathing jacket can extend completely to the steering wheel hub or as will be hereinafter described particularly in combination with a separate disk to prevent access by a cutting tool. As shown in FIGS. 1, 3, 4 and 5, the flanges 18 and 18' are open to enable positioning the sheathing jacket 12 over steering wheel 11. The edges of the flanges 18 and 18' contain channels 14 and 14' along at least a portion of the overall rim circumference and are adapted to receive reinforcing inserts 15 and 15'. Channels 14 and 14' are affixed by mechanical means such as compression or by welding. The channels 14 and 14' and the corresponding reinforcing inserts 15 and 15' may run partially or completely around the circumference of flanges 18 and 18' when the male end and the female end of the sheathing jacket 12 are engaged.

As shown in FIG. 1 the male end has reinforcing inserts 15 and 15' to engage female end channels 14 and 14' and these components are secured by the locking mechanism 13. In a preferred embodiment, the channel 14 and 14' are ratcheted and the male end of the reinforcing inserts 15 and 15' are equipped with sloping teeth to engage the ratcheted channels 14 and 14' and to interact with the locking mechanism 13. In another preferred embodiment the female end is slightly larger at one apex to allow some overlap when the ends are joined.

Figure 6:
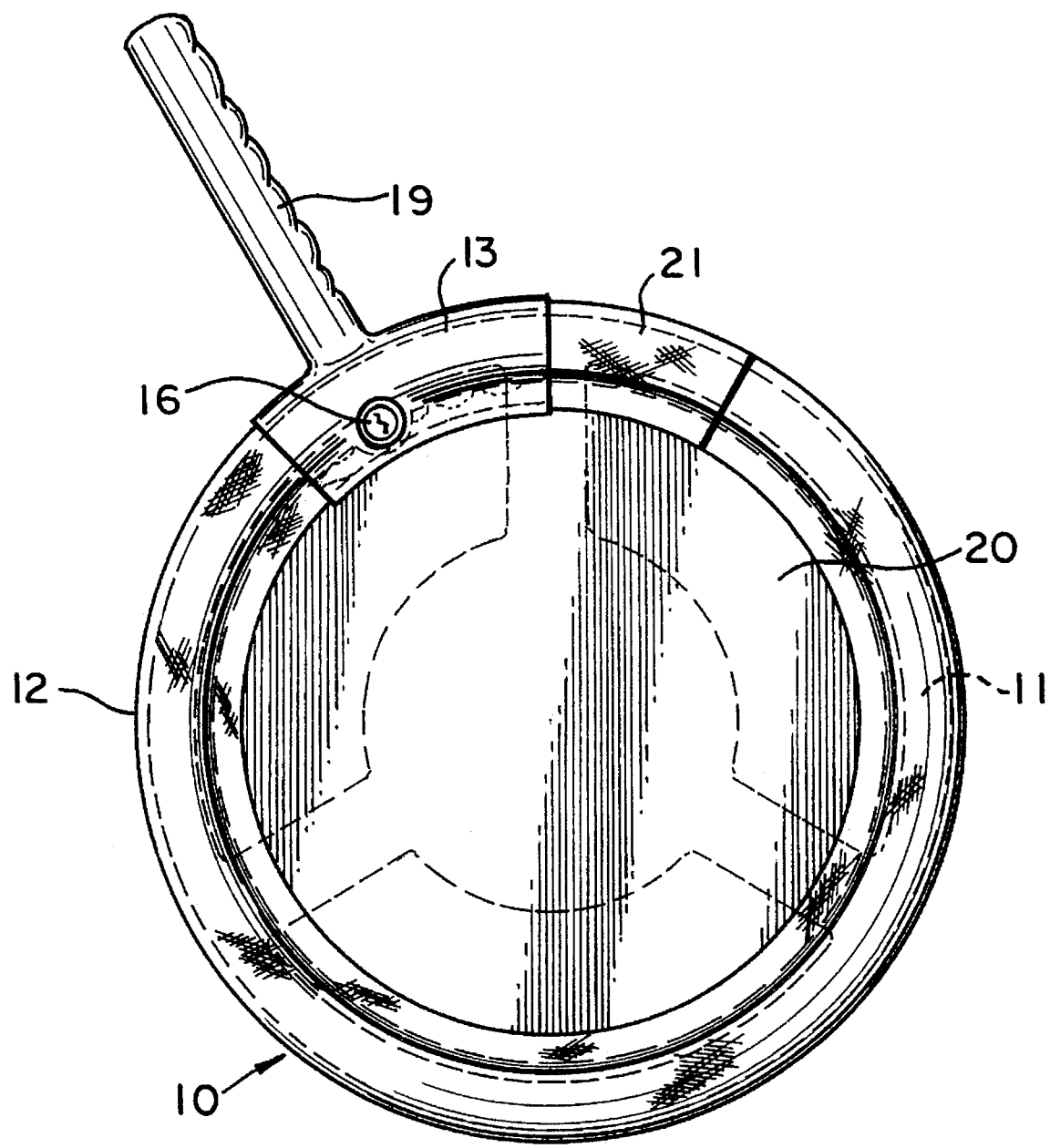
FIG. 6 is a top view of another embodiment of the present invention which shows a retaining plate which covers completely the area over the hub of the steering wheel.

As shown in FIGS. 1, 2 and 6 blocking bar 19 is integral with the locking mechanism 13 and extends in a lateral plane beyond the outer circumference of the rim to interfere or prevent the turning of the steering wheel 11. The bar 19 may be a fixed length or of adjustable lengths depending on the size needed to prevent rotation of the steering wheel 11. The rotation is prevented when the blocking bar 19 contacts the person, the door, the console, the floor or the windshield of a vehicle or vessel.

The sheathing jacket 12 is constructed of relatively flexible hard materials resistant to mechanical deformation such as by cutting, hammering, prying and is resistant to heat. For example, to the heat generated by a blow torch. Examples of suitable materials include metal and metal alloys, such as steel alloys, titanium alloys, high modulus polymers such as KEVLAR® marketed by E. I. DuPont, Wilmington, Del. and combinations of metals and polymers. These combinations include titanium alloy-reinforced rubber, steel-reinforced rubber, titanium alloy-reinforced high modulus fibers, steel reinforced high modulus fibers, and the like. The sheathing jacket 12 may be solid or constructed of a chain mesh from the materials described above.

The reinforcing inserts 15 and 15' may be in the form of a band, cable or straps and may be made of the above described hard materials.

The locking mechanism 13 and the blocking bar assembly 19 may be formed of a forged high strength alloy. Preferably, the far end of the blocking bar 19 has a rubber or plastic cover or coating for ease of handling but also to prevent damage to the contacting areas of the vehicle or vessel.

The locking mechanism 13 may be any conventional locking device and includes both key-operated or combination operated locks.

Shown in FIG. 4 is one form of locking means wherein with a key locking bolt 16 is locked into the locking mechanism 13 when the sheathing jacket 12 is in place or completely removed to unlock and remove the sheathing jacket 12.

In another preferred embodiment as shown in FIG. 6 the steering wheel locking device 10 includes a separate retaining means or disk 20 adapted to cover the area extending from the edges of the flanges 18 and 18' to over the hub of the steering wheel 11. The retaining means 20 fits under the sheathing jacket 12 and is secured in place by the locking mechanism 13. The retaining member 20 may also be constructed of the above described hard materials. The configuration of the retaining member 20 may be planar or two dimensional in order to conform with the design of the steering wheel. The shape may be circular or rectilinear. To accommodate layer wheel circumferences an insert 21 which is having channels into which inserts 15 and 15' are place to hold the insert 21.

The device of the invention can be adapted to fit various sized steering wheels by various methods all of which are contemplated by the invention. For example, the sheathing jacket can be extended by providing channeled sections 21 of varying sizes also. The end 17 may be of elongated and of a smaller diameter so as to be threaded into end 17.

Although the invention has been described with reference to a number of preferred embodiments, it will be appreciated that many variations and modifications may be made within the scope of the broad principles of the invention. Hence, it is intended that the preferred embodiments and all of such variations and modifications be included within the scope and spirit of the invention, as defined by the following claims:

What is claimed is:

1. A steering wheel locking device comprising:

a sheathing jacket consisting essentially of a wire mesh which is adapted to cover about one-half to about three-fourths of the circumferential thickness of a steering wheel rim which is adapted to circumferential thickness of a starring wheel rim which is adapted to completely cover the overall circumference of said rim;

said jacket having a female end and a male end, wherein said ends are positioned for mutual connection to each other;

a blocking bar that interfits in a lateral plane with said sheathing jacket and is adapted to extend beyond the overall circumference of said rim to interfere and to prevent the turning of a steering wheel;

a retaining disk member which fits under said jacket and is adapted to cover an area over a hub of said steering wheel; and a locking mechanism adapted to secure said male and female ends of said sheating jacket and the blocking bar together on said steering wheel.

2. The device of claim 1 wherein said jacket and said bar comprise a hard material resistant to mechanical deformation.

3. The device of claim 2 wherein said hard material is selected from the group consisting of titanium alloy, steel, steel reinforced-rubber, titanium alloy reinforced rubber, steel reinforced high modulus fibers, titanium alloy reinforced high modulus fibers and combinations of any or all materials in said group.

4. The device of claim 1 wherein said sheathing jacket is adapted to cover an area between a steering wheel rim and a steering wheel hub.

5. The device of claim 1 wherein a blocking bar assembly comprises a blocking bar integral with a locking device and an arcuate member which fits over the sheathing jacket.

6. The device of claim 1 wherein said sheathing jacket contains channels located near the edges of said sheathing jacket and said channels are adapted to receive reinforcing insert members.

7. The device of claim 6 wherein said channels and said reinforcing insert members are adapted to extend completely around the inner circumference of the rim circumference.

8. The device of claim 6 wherein the male end inserts are adapted to engage the open channels at the female end of the sheath jacket and a lock for securing the inserts, the sheathing jacket and the blocking bar.

9. The device of claim 6 wherein said reinforcing inserts have a portion with sloping teeth at the male end adapted to engage the locking mechanism of said lock.

10. The device of claim 6 wherein said reinforcing inserts are selected from cables, straps and bands.

11. The device of claim 1 including means for varying the circumferential length of said jacket.

12. The device of claim 1 wherein the lock is a key-operated lock.

13. The device of claim 1 wherein said lock is a removable cylinder lock.

14. The device of claim 1 wherein said wire mesh is made of hard material selected from steel or titanium alloy.

15. The device of claim 1 wherein said retaining disk member has a circular shape.

* * * * *